Oct. 28, 1969 R. H. HOMEYER 3,474,573
MACHINE TOOL CONTROLS

Filed Nov. 24, 1965 2 Sheets-Sheet 1

INVENTOR
ROGER H. HOMEYER,
BY
K. W. Brunell
ATTORNEY

United States Patent Office 3,474,573
Patented Oct. 28, 1969

3,474,573
MACHINE TOOL CONTROLS
Roger H. Homeyer, Tonawanda, N.Y., assignor to The Carborundum Company, Niagara Falls, N.Y., a corporation of Delaware
Filed Nov. 24, 1965, Ser. No. 509,515
Int. Cl. B23q 5/00
U.S. Cl. 51—92    6 Claims

ABSTRACT OF THE DISCLOSURE

A machine tool having a reciprocating table for supporting workpieces and a cutting element mounted for vertical movement relative to said table. A feed attachment is provided for automatic control of the machine tool, when desired. The feed attachment comprises an electrical control means having a first synchronous motor for actuating a cross-feed mechanism at the end of each longitudinal stroke of the table an da second synchronous motor for vertically moving said cutting element at the end of each complete pass.

---

This invention relates to machine tool controls and more particularly to apparatus for converting manual machine controls to automatic operation.

Certain machine tools, such as grinding machines, are designed for unit production. A skilled machinist manually adjusts the machine controls while it is operating to produce an article having the desired dimensions. A reciprocating table surface grinder, for example, has a horizontal spindle on which a straight grinding wheel is mounted. The wheel grinds workpieces on its peripheral surface. The spindle on which the grinding wheel is mounted is carried in bearings in a wheel head. The wheel head is mounted on the machine column and is adjustable vertically relative to the table by turning a hand wheel. The workpieces are mounted on the table which reciprocates under the grinding wheel. Usually, the direction of travel of the table is reversed automatically at the end of each stroke and the length of the stroke is adjusted by means of stops. The table itself is mounted on a saddle for cross-feeding the table in and out relative to the grinding wheel.

Manually adjustable grinding machines and other machine tools of this type are versatile and easily adjusted to produce articles of different sizes and shapes. For this reason, these machines are widely used by small manufacturers who are producing a variety of products, or they may be used by a large manufacturer, in a local area of the plant where small jobs may be conveniently set up and run by a machinist.

One disadvantage of these machines is that they require the constant attention of the machinist. In some operations, a considerable amount of time is required for grinding a workpiece to the desired size, because a large number of passes under the grinding wheel are necessary. This is a particularly serious problem when very hard metals are being finished on a surface grinder. The machinist must be present almost continuously after the machine is started in order to feed the saddle inwardly at the end of each stroke. Also, the direction of travel of the saddle must be reversed and the wheel head must be fed downwardly after each pass of the wheel from one side of the workpiece to the other. This type of manual operation over a long period of time causes the machinist to become fatigued, resulting in errors.

Accordingly, it is an object of this invention to provide apparatus for converting manually operated grinding machines to automatic operation.

It is a further object of this invention to provide an automatic operation conversion apparatus which is easily installed on existing manual machines.

It is a still further object of this invention to provide an automatic machine control attachment which accurately controls the grinding operations of conventional manual surface grinders and is readily adjustable.

These objects are accomplished in accordance with a preferred embodiment of this invention by mounting a constant speed electric motor adjacent each hand wheel shaft of a conventional reciprocating table type machine and interconnecting the rotor of the electric motor with the hand wheel shaft through a speed reducer. The motors are driven independently at appropriate intervals for turning the respective hand wheel shafts in accordance with a predetermined time sequence. The duration of the operation of each motor is controlled by a timer which is preset to provide the desired increment of feed. Limit switches are mounted on the machine at appropriate positions for initiating and stopping operation of the control system. Thus, the only connections between the machine and the automatic control of this invention are the direct connections of the motors with the respective hand wheel shafts and the mounting of several limit switches at prescribed locations on the frame of the machine.

This preferred embodiment is illustrated in the accompanying drawing in which.

Figure 1:
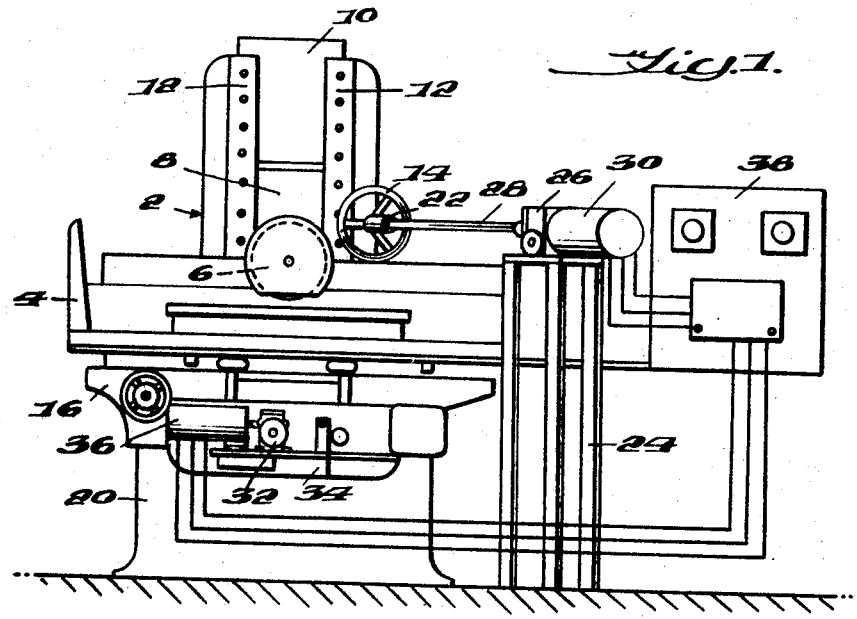
FIG. 1 is a front elevational view of a conventional surface grinder to which the control system of this invention is attached.

A typical manually controlled surface grinder 2 is illustrated in FIG. 1. The grinder has a table 4 which reciprocates longitudinally under a grinding wheel 6. The wheel 6 is mounted on a wheel head 8 which extends outwardly from an upright column 10. The wheel head 8 is mounted on vertical guides 12 and a hand wheel 14 turns a shaft which causes the wheel 6 and the wheel head 8 to move vertically relative to the table 4.

The table 4 is mounted on a saddle 16 which moves horizontally in and out relative to the column 10. The position of the saddle relative to the wheel 6 is controlled by a hand wheel shaft 18 which turns a lead screw and causes the saddle to move relative to the base 20 of the machine in a direction parallel to the rotational axis of the wheel 6.

In converting the convenient machine 2 for automatic control by the apparatus of this invention, a coupling 22 is welded or otherwise secured to the hand wheel 14 or its shaft. An upright frame 24 is positioned adjacent the hand wheel 14 and a speed reducer 26 is mounted on the frame 24. A shaft 28 forms a driving connection between the speed reducer 26 and the coupling 22. An electric motor 30 is also mounted on the frame 24 for driving the hand wheel shaft through the speed reducer 26 and the shaft 28. Another speed reducer 32 is mounted directly on the end of the hand wheel shaft 18. The speed reducer 32 is supported by a platform 34 which is attached to the saddle 16. An electric motor 36 is mounted on the platform 34 for driving the speed reducer 32. A suitable control panel 38 is mounted next to the machine.

Figure 5:
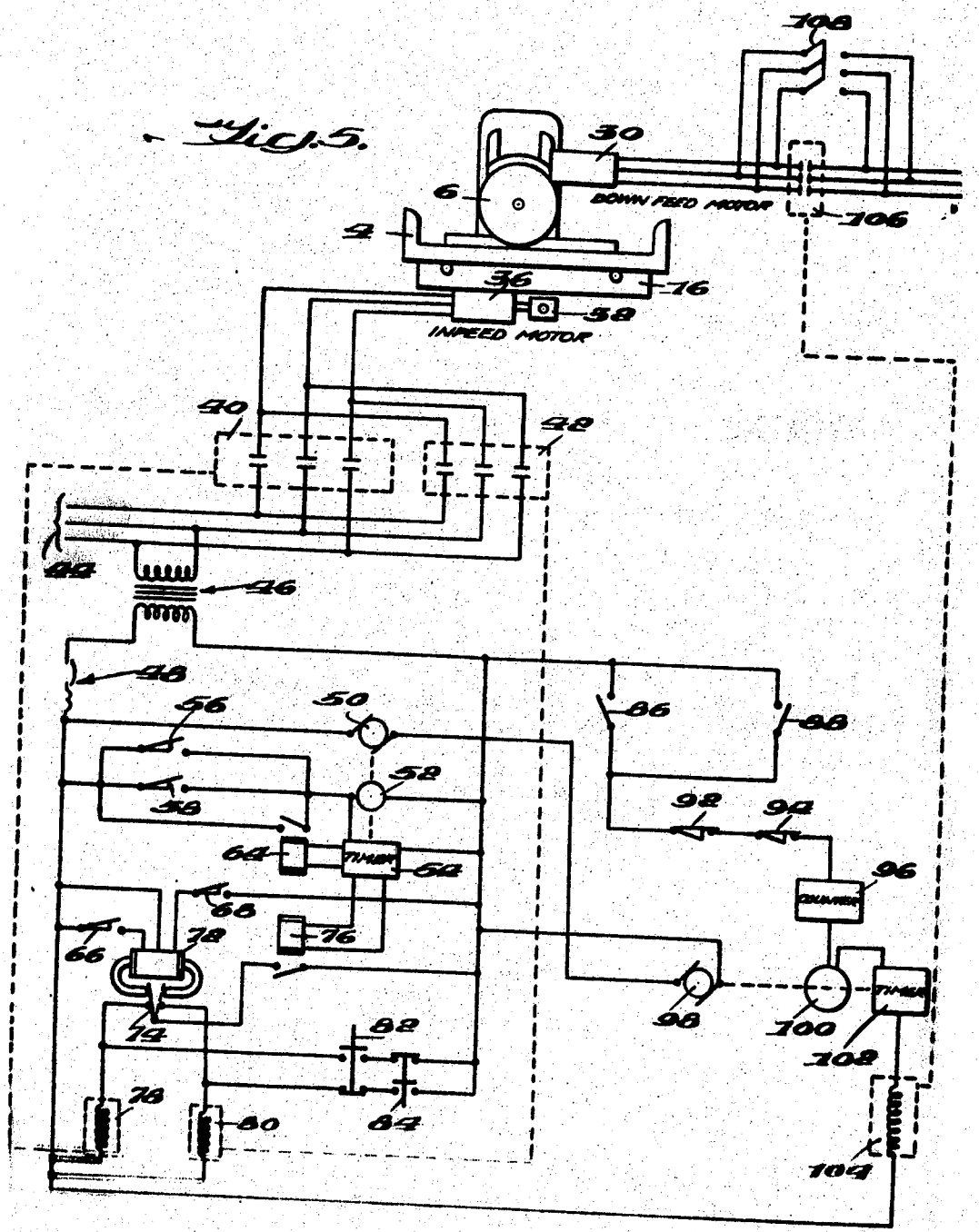
FIG. 5 is a schematic diagram of the control circuit of this invention.

Referring to FIG. 5, the infeed motor 36 which drives the lead screw for the saddle 16 through a speed reducer 32 may be turned in either direction depending on whether the forward motion set of contacts 40 are closed or the rearward motion set of contacts 42 are closed. Preferably, the motor is supplied at 44 with three-phase 60 cycle 440 volts alternating current. The circuit for controlling the operation of the contacts 40 and 42 receives current from a transformer 46 through a circuit breaker 48. The control circuit includes a reset timer which consists of a synchronous motor 50, a solenoid clutch 52 and timer contacts 54. An example of such a timer is the "microflex" reset timer manufactured by the Eagle Signal Company. The motor 50 operates continuously and drives the timer contacts 54 when the clutch 52 is energized. Generally, the timer may be of the type having an armature which is driven by the timer motor 50 when the clutch 52 is engaged. A contact arm is mounted on the armature and as the armature turns, the contact arm sweeps across a contact plate. At a particular angular orientation, the contact arm moves out of engagement with the contact plate. Thus, by adjusting the initial position of the contact arm, or by adjusting the effective length of the contact plate, the timer contact arm can be set to pass current during a predetermined time interval. The time interval is preset on the timer contacts 54 and 102 to provide the desired feed for the saddle 16 and the wheel 6 respectively.

Figure 2:
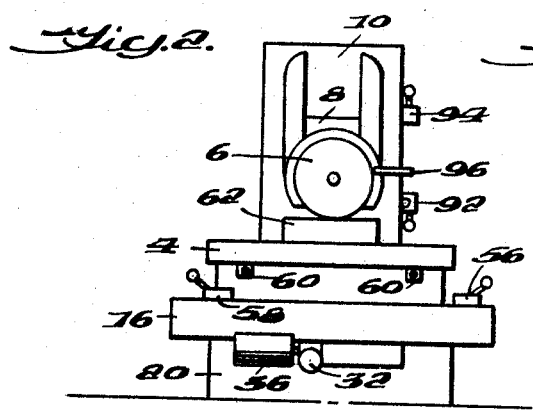
FIG. 2 is a schematic view of the grinding machine showing the position of the limit switches.

The operation of the clutch 52 is controlled in accordance with this invention by limit switches 56 and 58. The position of these switches is shown schematically in FIGS. 2 and 3. Stops 60 are mounted on the table 4 to trip the switches 56 and 58. The positions of the stops 60 may be adjusted along the length of the table 4, so that the switches 56 and 58 are tripped after the table has displaced the end of the workpiece 62 out of engagement with the wheel 6. The limit switches 56 and 58 are normally open, but they are closed by the stops 60 when the table 4 is at either end of its stroke. When one of the switches 56 and 58 is closed, the solenoid clutch 52 is energized and current flows through the timer contacts 54 to energize a relay 64 which maintains the clutch 52 engaged, although the table 4 may release the switch 56 or 58 by moving away from the closed contact. The motor 50 continues to drive the timer contacts 54 through the preset time interval, and at the end of the time interval, the timer contacts 54 open, thereby de-energizing the relay 64 and disconnecting the clutch 52.

The timer contacts 54 also control the motor contacts 40 and 42. When the forward motion contacts 40 are closed, the motor 36 turns the lead screw in one direction for moving the saddle 16 toward the front of the machine. If the rearward motion contacts 42 are closed, the motor 36 turns the lead screw in the opposite direction for driving the saddle 16 toward the rear of the machine. The movement of the saddle 16 is controlled by limit switches 66 and 68 which are normally open and are mounted on the saddle 16. The switches are in position to engage a stop 70 on the column 10 of the machine. The positions of the limit switches 66 and 68 may be adjusted relative to the saddle 16, so that the direction of movement of the saddle may be reversed after the wheel 6 has advanced beyond either of the opposite sides of the workpiece.

As shown in FIG. 5, the limit switches 66 and 68 control a polarized relay 72 which has a snap action switch 74. When the relay 66 is closed by the saddle moving toward the rear of the machine, the relay 72 is energized to draw the switch lever 74 toward the position shown in full lines in FIG. 5. The closing of the contacts is controlled by a separate relay 76 which is energized by the timer contacts 54. When the relay switch 76 is closed, current flows through the switch lever 74 and through a relay coil 78 which is in position for closing the motor contacts 40. The contacts 40 remain closed throughout the time interval set on the timer contacts 54. After the predetermined time interval, the contacts 54 open and the relay 76, so that current flows through the motor contacts of current through the relay coil 78 and causing the contacts 40 to open. Therefore, the motor 36 stops.

The direction of movement of the saddle 16 is reversed when the saddle 16 is at the forward end of its stroke by the switch 68 (FIG. 3) which engages the stop 70. When the switch 68 is closed by the stop 70, the switch lever 74 swings over to the position shown in dotted lines and remains in that position after the table moves away from the stop 70 and after the switch 68 opens. When one of the table motion switches 56 and 58 is closed, the solenoid clutch 52 causes the timer contacts 54 to close the relay 76, so that current flows through the motor contacts relay coil 80. This causes the motor contacts 42 to close, thereby operating the motor 36 to rotate the lead screw and move the saddle 16 in a rearward direction. A manual switch 82 is provided for closing the switch contacts 40 to drive the saddle 16 in a forward direction and another manual switch 82 closes the contacts 42 for driving the saddle in the rearward direction manually.

Figure 3:
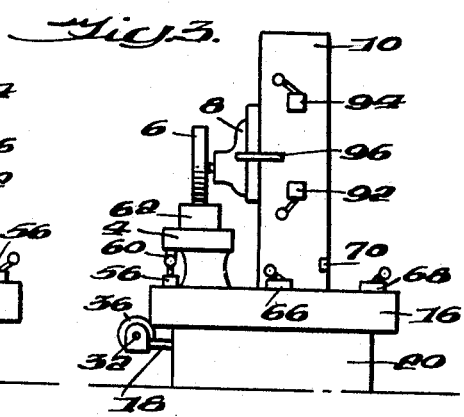
FIG. 3 is a side elevational view showing schematically the position of the limit switches.
Figure 4:
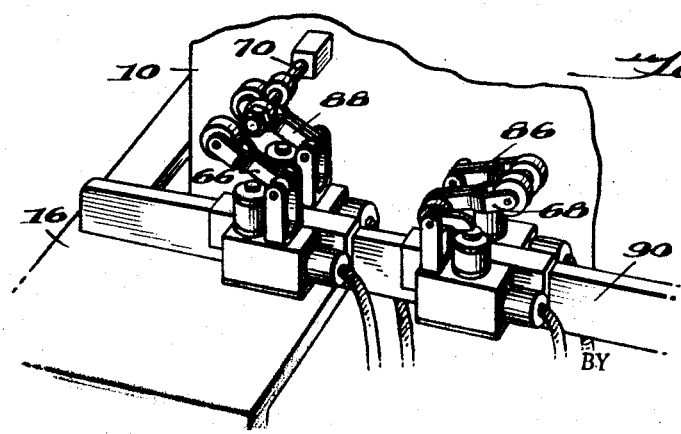
FIG. 4 is a perspective view showing the mounting of the limit switches on the saddle.

At the end of each complete pass of the grinding wheel 6, from one side of the workpiece to the other, the grinding wheel 6 is fed down toward the table so that the wheel will remove a thin layer of metal on the next pass across the workpiece. The downfeed motor 30 is connected by means of the shaft 28 to the hand wheel shaft of the wheel head 8, as shown schematically in FIG. 5. It is only necessary to feed the grinding wheel 6 in a downward direction, since the workpiece is mounted under the wheel. The downfeed occurs at approximately the same point at which the saddle is reversed in its direction of travel. Therefore, the downfeed limit switches 86 and 88 are positioned side-by-side with the limit switches 66 and 68 as shown in FIG. 4. A bar 90 is mounted at one end on the saddle 16 and projects rearwardly along the upright column 10. The rearward saddle limit switch 68 is mounted at the rear end of the bar 90 and the forward saddle limit switch 66 is mounted at the forward end of the bar 90. On the opposite side of the bar, is a front downfeed switch 88 and at the rear end of the bar 90 is the other downfeed switch 86. The stop 70 is in the form of a rod which is mounted on the column 10 and projects outwardly in position to engage the levers of the respected switches on the bars 90. Accordingly, both switches 86 and 68 are tripped at approximately the same time at the forward extreme of travel and the switches 66 and 88 are tripped at about the same time when the saddle is in its rearmost position. As shown in FIG. 5, when one of the switches 86 and 88 is closed, current flows through a pair of limit switches 92 and 94 to a counter 96. The limit switches 92 and 94 are normally closed and as shown in FIG. 3, are in position to be engaged by a stop 96 on the wheel head 8 when it reaches its lowermost or uppermost extent of travel. The counter 96 is a conventional electrical impulse counter which opens a switch after a predetermined number of cycles. An example of such a counter is the Veeder Root counter.

A timer motor 98 operates continuously and drives a solenoid clutch 100 similar to the clutch 52. Timer contacts 102 are in series circuit with the clutch solenoid coil and when the contacts 102 are closed, current flows through the relay coil 104 for operating the downfeed motor 30. The coil 104 is in position for closing the motor contacts 106 when the coil is energized. Current flows through the timer contacts 102 during a preset time interval and the timer contacts are then opened. While the timer contacts 102 are closed, current flows through the closed contacts 106 to operate the motor 30 for feeding the wheel 6 downwardly. A manual switch 108 is provided for selectively operating the motor in the opposite direction for raising the wheel head.

In operation, the grinding machine is set up with the stops 60 positioned on the table 4 at the appropriate distances with respect to the limit switches 56 and 58 to operate one of the switches at each end of the stroke of the table. Preferably, the switch 56 or 58 is closed after the table has moved the workpiece out of engagement with the grinding wheel 6 and approximately at the point at which the table travel reverses. The positions of the limit switches 66 and 88 are adjusted with respect to the stop 70 to correspond to the width of the workpiece on the table 4. The limit switches 86 and 88 also are positioned with respect to the stop 70 to correspond to the positions of the switches 66 and 68.

The timer contacts 54 and 102 are adjusted to open the contacts after a predetermined time interval corresponding to the amount of feed required for the saddle and wheel head, respectively. The machine 2 is then started. In the conventional operation of the grinder 2, the wheel 6 rotates at a high speed and the table 4 reciprocates under the wheel automatically. At the end of each stroke of the table, one of the switches 56 and 58 is closed by the corresponding stop 60 which causes the timer contacts 54 to close for a predetermined time interval during which the saddle motor 36 is operated. The motor turns either in the forward or reverse direction, depending upon the position in the switch lever 74. The movement of the table 4 is not interrupted while the saddle feed motion takes place. This cycle repeats at each end of the stroke of the table. At each limit of movement of the saddle 16, one or the other of the switches 66 and 68 engages the stops 70 to reverse the direction of the movement of the saddle 16 by displacing the switch 74.

At the same time that one of the saddle limit switches 66 and 68 are operated, the adjacent downfeed switch 86 or 88 is closed. This causes the downfeed motor contacts 106 to be closed during a time interval as determined by the timer contacts 102 which are driven by the timer motor 98. Both of the switches 86 and 88 cause the wheel head to feed downwardly. The downfeed continues until the lower limit switch 92 is opened, or until the operator stops the machine, or until a predetermining counter stops the machine on the basis of the number of passes. A manual switch 108 is provided for raising the wheel head by means of the motor 30.

The control system of this invention is designed to be readily attached to any of the several different types of surface grinders or other similar machine tools, which are normally operated manually. The wheel head motor 30 is mounted on a stand 26 which is at a convenient height for coupling to the wheel head hand wheel 14. If the vertical movement of the wheel head 8 is relatively small, a solid connecting shaft 28 with universal joints at each end may be used, but if fairly large amount of travel of the wheel head is anticipated, a splined tube must be used for the shaft 28 to allow the length of the shaft to change as the distance between the hand wheel and the speed reducer 26 changes during vertical movement of the wheel head. The saddle motor 36 and speed reducer 32 are preferably mounted on a bracket 34 which may conveniently be mounted directly on the saddle 16. Since the speed reducer 32 is coupled directly to the saddle lead screw, it may be necessary to provide shims or other means for adjusting the mounting position of the speed reducer 32, so that it is aligned with the shaft 18.

The control system of this invention is assembled as a package. The components are entirely independent of the machine controls and when the motors and speed reducers are disconnected from the machine, it can be readily restored to its original manual operating condition merely by replacing the hand wheel on the lead screw shaft 18. For convenience, the stops 60, 70 and 96 may remain on the machine, and if desired, the limit switches 56, 58, 66, 68, 86, 88, 92 and 94 may also be left on the machine, since they do not interfere in any way with the manual operation of the machine.

While this invention has been illustrated and described in one embodiment, it is recognized that variations and changes may be made therein without departing from the invention as set forth in the claims.

I claim:

1. In a machine tool of the type having a reciprocating table mounted on a saddle that reciprocates at right angles to the table and a rotary cutting element mounted on a head that is adjustable perpendicularly to the surface of the table, the relative positions of said saddle and said head being controlled by separate manually adjusted rotary shafts, a separable indexing attachment comprising:

a first electric motor having a rotor shaft, means for coupling said first motor shaft in driving relation to said saddle rotary shaft, means for starting operation of said motor in response to movement of said table to a predetermined position, means for stopping operation of said motor after a predetermined time interval, said starting means including switch means on said machine tool in position to be engaged by said table at opposite ends of the path of reciprocating movement of said table, said starting means also including means for connecting said first motor with a source of electrical power upon actuation of said switch means, said stopping means including a synchronous electric motor and timer means, said timer means including means for disconnecting said first motor from said source after a predetermined time interval, a second electric motor having a rotary shaft, means for coupling said second motor shaft to said head shaft, means for starting operation of said second motor in response to movement of said saddle to a predetermined position, means for stopping operation of said second motor after a predetermined time interval, said second starting means including switch means on said machine tool in position to be engaged by said saddle at opposite ends of the path of reciprocating movement of said saddle, said second starting means also including means for connecting said second motor with a source of electrical power upon actuation of said second motor switch means, said stopping means including a second synchronous electric motor and second timer means, said second timer means including means for disconnecting said second motor from said source after a predetermined time interval, whereby said attachment is coupled to said saddle manual feed shaft and said cutting head manual feed shaft of the machine tool thereby converting a manually operated machine tool to automatic operation.

2. In a machine tool according to claim 1 wherein said first timer means includes a synchronous electric motor and a rotary timer and clutch means interposed between said synchronous motor and said timer, said starting switch means activating said clutch means to transmit rotary motion from said motor to said timer, said disconnecting means deactivating said clutch means after a predetermined degree of rotation of said timer.

3. In a machine tool according to claim 2 wherein said timer degree of rotation is adjustable whereby the increment of advance of said saddle by said first motor is adjustable.

4. In a machine tool according to claim 1 including limit switch means on said machine tool in position to be engaged by said saddle at opposite ends of the path of reciprocating movement thereof, said limit switch means cooperating with said first motor connecting means to reverse the rotation of said first motor shaft when the saddle reaches one end of its path of movement.

5. In a machine tool according to claim 1 wherein said second timer means includes a synchronous electric motor and a rotary timer and clutch means interposed between said synchronous motor and said timer, said second starting switch means activating said clutch means to transmit rotary motion from said motor to said timer, said second disconnecting means deactivating said second clutch means after a predetermined degree of rotation of said timer.

6. In a machine tool according to claim 5 including counter means for rendering ineffective said second motor starting means after a predetermined number of operations of said second starting means.

References Cited

UNITED STATES PATENTS

| | | | |
|---|---|---|---|
| 2,240,506 | 5/1941 | Levesque. | |
| 2,360,671 | 10/1944 | Haas | 51—93 |
| 2,740,236 | 4/1956 | Flygare | 51—92 |
| 2,767,332 | 10/1956 | Willard | 318—486 X |
| 2,859,564 | 11/1958 | Farmer | 51—93 |
| 2,986,852 | 6/1961 | Wilson | 51—92 |
| 3,044,000 | 7/1962 | Bahra | 318—486 X |

ROBERT C. RIORDON, Primary Examiner

D. G. KELLY, Assistant Examiner

U.S. Cl. X.R.

318—39, 282